United States Patent
De Vos et al.

(10) Patent No.: US 10,215,496 B2
(45) Date of Patent: Feb. 26, 2019

(54) MULTI-FLOW HEAT EXCHANGER FOR EXCHANGING HEAT BETWEEN COOL FLUID AND HOT FLUID

(71) Applicant: Scambia Holdings Cyprus Limited, Limassol (CY)

(72) Inventors: Yves De Vos, Zemst (BE); Freddy Wollants, Aarschot (BE); Jean-Paul Hubert Janssens, Leopoldsburg (BE)

(73) Assignee: Bosal Emission Control Systems NV, Lummen (BE)

( * ) Notice: Subject to any disclaimer, the term of this patent is extended or adjusted under 35 U.S.C. 154(b) by 632 days.

(21) Appl. No.: 14/180,836

(22) Filed: Feb. 14, 2014

(65) Prior Publication Data

US 2014/0231048 A1 Aug. 21, 2014

(30) Foreign Application Priority Data

Feb. 19, 2013 (EP) .................................... 13155768

(51) Int. Cl.
*F25B 29/00* (2006.01)
*F28D 7/00* (2006.01)
(Continued)

(52) U.S. Cl.
CPC ......... *F28D 7/0008* (2013.01); *F28D 9/0093* (2013.01); *F28D 2021/0043* (2013.01);
(Continued)

(58) Field of Classification Search
CPC .................. F28D 7/0008; F28D 9/0093; F28D 2021/0043
See application file for complete search history.

(56) References Cited

U.S. PATENT DOCUMENTS 3,315,731 A * 4/1967 Jensen ................. B60H 1/3227
165/140
4,002,201 A * 1/1977 Donaldson ............ F28D 1/0333
165/140
(Continued)

FOREIGN PATENT DOCUMENTS

CN 101600930 A 12/2009
DE 202005015627 U1 3/2007
(Continued)

OTHER PUBLICATIONS

European Search Report for EP Application No. 13155768 dated Jul. 12, 2013 (6 pages).
(Continued)

*Primary Examiner* — Ljiljana Ciric
(74) *Attorney, Agent, or Firm* — Merchant & Gould (57) ABSTRACT

The heat exchanger includes a cool conduit (2,3), a hot conduit (4) and a heat exchanging element (1) arranged between the cool conduit (2,3) and the hot conduit (4). The heat exchanger also includes at least one further conduit (3,2) arranged next to the cool conduit (2,3) or to the hot conduit (4) on a same side of the heat exchanging element (1) as said respective cool or hot conduit. The further conduit is separated from the respective cool or hot conduit by a separator (5) that includes two separating elements (51,52) arranged at a distance to each other and forming a cavity (53) between the two separating elements (51,52). The separator restricts a fluid flow into or in the cavity (53) such as to limit a heat exchange between the further conduit (3,2) and the respective cool or hot conduit on the same side of the heat exchanging element (1).

5 Claims, 2 Drawing Sheets

(51) Int. Cl.
*F28D 9/00* (2006.01)
*F28D 21/00* (2006.01)
*H01M 8/04007* (2016.01)
*H01M 8/124* (2016.01)

(52) U.S. Cl.
CPC ....... *F28F 2265/12* (2013.01); *F28F 2265/26* (2013.01); *F28F 2270/02* (2013.01); *H01M 8/04074* (2013.01); *H01M 2008/1293* (2013.01); *Y02P 70/56* (2015.11)

(56) References Cited

U.S. PATENT DOCUMENTS

| | | | | |
|---|---|---|---|---|
| 4,327,802 | A * | 5/1982 | Beldam | F28D 1/0333 165/153 |
| 4,651,816 | A * | 3/1987 | Struss | F28D 1/0452 165/140 |
| 4,800,954 | A * | 1/1989 | Noguchi | F28D 1/0341 165/153 |
| 4,860,823 | A * | 8/1989 | Noguchi | F28D 1/035 165/153 |
| 4,915,165 | A * | 4/1990 | Dahlgren | F28F 3/046 165/166 |
| 4,923,001 | A * | 5/1990 | Marcolin | F01P 11/08 123/41.33 |
| 5,000,257 | A * | 3/1991 | Shinmura | F28D 1/0435 165/140 |
| 5,033,540 | A * | 7/1991 | Tategami | F28D 1/0435 165/135 |
| 5,042,577 | A * | 8/1991 | Suzumura | B23K 1/0012 165/153 |
| 5,180,004 | A | 1/1993 | Nguyen | |
| 5,462,113 | A * | 10/1995 | Wand | F28D 9/0093 165/140 |
| 5,603,159 | A * | 2/1997 | Tsubakida | B21D 53/04 29/890.039 |
| 5,720,341 | A * | 2/1998 | Watanabe | F28D 1/024 165/135 |
| 5,884,696 | A * | 3/1999 | Loup | F28D 1/0333 165/140 |
| 5,927,396 | A * | 7/1999 | Damsohn | F28D 9/0062 165/135 |
| 5,964,282 | A * | 10/1999 | Seiler | F28D 1/0333 165/140 |
| 6,035,927 | A * | 3/2000 | Krauss | B23K 1/0012 165/135 |
| 6,044,902 | A | 4/2000 | Pahade et al. | |
| 6,170,565 | B1 * | 1/2001 | Nishishita | F28D 1/0435 165/135 |
| 6,196,304 | B1 * | 3/2001 | Schwarz | F28D 1/0325 165/11.1 |
| 6,318,455 | B1 * | 11/2001 | Nakado | F28D 1/0341 165/153 |
| 6,340,053 | B1 * | 1/2002 | Wu | F28D 9/0012 165/140 |
| 6,360,817 | B1 * | 3/2002 | Brochin | B60H 1/00328 165/140 |
| 6,502,420 | B2 * | 1/2003 | Gupte | F28F 3/046 165/140 |
| 6,989,134 | B2 | 1/2006 | Tonkovich et al. | |
| 7,250,151 | B2 | 7/2007 | Tonkovich et al. | |
| 7,393,605 | B2 | 7/2008 | Blanchet et al. | |
| 7,946,339 | B2 * | 5/2011 | So | F28D 1/0246 165/140 |
| 8,220,529 | B2 * | 7/2012 | Kim | F24H 1/48 122/235.16 |
| 2003/0031904 | A1 | 2/2003 | Haltiner, Jr. | |
| 2007/0137843 | A1 | 7/2007 | Gievers | |
| 2007/0295027 | A1 | 12/2007 | Howard et al. | |
| 2011/0083833 | A1 | 4/2011 | Zorzin et al. | |

FOREIGN PATENT DOCUMENTS

| | | |
|---|---|---|
| EP | 0719997 A1 | 7/1996 |
| EP | 1193462 A2 | 4/2002 |
| EP | 1348484 A2 | 10/2003 |
| EP | 1162171 B1 | 11/2005 |
| EP | 1306639 B1 | 12/2006 |
| EP | 1284813 B1 | 8/2007 |
| EP | 1239251 B1 | 8/2008 |
| EP | 2407224 A1 | 1/2012 |
| FR | 2811747 | 1/2002 |
| FR | 2912209 | 8/2008 |
| GB | 22379730 | 3/2004 |
| JP | 2003050047 A | 2/2003 |
| JP | 2006010130 A | 1/2006 |
| JP | 2006-220319 A | 8/2006 |
| JP | 2007093199 A | 4/2007 |
| JP | 2009-519431 A | 5/2009 |
| JP | 2009-133607 A | 6/2009 |
| WO | 2007/083862 A1 | 7/2007 |

OTHER PUBLICATIONS

Office Action for Japanese Patent Application No. 2014-028758 (dated Jan. 9, 2018).

\* cited by examiner

MULTI-FLOW HEAT EXCHANGER FOR EXCHANGING HEAT BETWEEN COOL FLUID AND HOT FLUID

CROSS-REFERENCE TO RELATED APPLICATION

This application claims the priority benefit of European Patent Application No. 13155768.8, filed on Feb. 19, 2013, which is hereby incorporated herein by reference.

TECHNICAL FIELD

The invention generally relates to the field of combined heat exchangers. Especially, it relates to multi-flow heat exchangers.

BACKGROUND

There exist heat exchanger modules, where two cool fluids are heated by one hot fluid. While one cool fluid shall be heated less than the other, the one fluid is arranged at the already cooled down side of the hot fluid, while the other cool fluid is arranged at the hot inlet side of the hot fluid. These heat exchanger modules are adapted to the heating of the two cool fluids but are not optimized for a heat recovery from the hot fluid.

There are applications known, for example the operation of fuel cells, which provide two exhaust or discharge fluids at elevated temperatures. Heat stored in these fluids is made available for further use through guiding each of the fluids into heat exchangers. Next to the fact that several heat exchangers are costly and require space, these exhaust fluids often are at different temperatures, which has to be taken into account when optimizing a heat exchanging process.

Therefore, there is a need for heat exchangers that take into account disadvantages of the state of the art. Especially, there is need for a heat exchanger that is weight and space saving and allows for reduced production costs.

SUMMARY

In a first aspect of the present invention, there is provided a heat exchanger. The heat exchanger comprises a cool conduit adapted for guiding a cool fluid through the cool conduit, the cool conduit having a cool fluid inlet and a cool fluid outlet. The heat exchanger further comprises a hot conduit adapted for guiding a hot fluid through the hot conduit, the hot conduit having a hot fluid inlet and a hot fluid outlet. A heat exchanging element is arranged between the cool conduit and the hot conduit for exchanging heat between the cool fluid and the hot fluid. The heat exchanger further comprises at least one further conduit for guiding a fluid through the further conduit. The further conduit has a fluid inlet and a fluid outlet. The further conduit is arranged next to the cool conduit or to the hot conduit on a same side of the heat exchanging element as said respective cool or hot conduit. The further conduit is separated from the respective cool or hot conduit by a separator comprising two separating elements arranged at a distance to each other and forming a cavity between the two separating elements. The separator limits a fluid flow into or in the cavity or both such as to limit a heat exchange between the further conduit and the respective cool or hot conduit arranged on the same side of the heat exchanging element.

With the heat exchanger according to the invention several fluid flows, preferably three or more are integrated into one heat exchanger. This reduces production and manufacturing costs, since no separate heat exchangers have to be manufactured and assembled for two flows each. Therefore, also one housing only is required, which may, for example, be a steel envelope. This further reduces material costs and weight. In addition, space may be saved, especially also since no several individual components are present and no connecting tubes are needed between at least some of these individual components that are combined in the heat exchanger according to the invention. While preferably the further conduit is a second cool conduit such that two cool conduits are arranged next to each other separated by the separator with one hot conduit on the reverse side of the heat exchanging element, the invention is not limited thereto. The further conduit may also be a hot conduit such that two hot conduits are arranged next to each other separated by the separator with one cool conduit only on the reverse side of the heat exchanging element. Depending on the application more than two cool or two hot conduits may be arranged next to each other with one or more hot or cool conduits arranged on the reverse side of the heat exchanging element, respectively. Preferably, the fluids in the neighbouring conduits differ in at least one of temperature, aggregate state or chemical composition. However, embodiments may be realized where one flow is separated by a separator to flow in neighbouring conduits as will be described below.

By the provision of a separator forming a cavity between separating elements, not only two fluid flows may be separated in a fluid-tight manner, also a heat transfer from one flow to the other on the same side of the heat exchanging element may be minimized. A heat transfer reduction up to or over a factor of 10 may be realized compared to the use of a single spacer arranged between two fluid flows. In addition, mechanical stress in the heat exchanging element due to large temperature differences in neighbouring fluid flows may be reduced. Large temperature differences in neighbouring fluid flows may lead to large temperature gradients over low distances. Mechanical stress induced by large temperature gradients is especially difficult to handle in case of thin heat exchanging elements, which are preferably used to maximize a heat transfer from the cool side of the heat exchanging element to the hot side of the heat exchanging element.

A distance between the two separating elements of the separator is greater than 0 mm in order to form a cavity along the entire length of the two separating elements. The distance between two separating elements may vary and may be adapted to for example the size of the heat exchanger or a temperature regime of different fluids used in the heat exchanger. However, in preferred embodiments the distance between two separating elements is in a range between about 5 mm and about 50 mm, more preferably in a range between about 10 mm and about 35 mm, most preferably in a range between about 15 mm and about 30 mm, for example 25 mm.

While the entire separator may be constructed by two separating elements forming a cavity in between the two separating elements, also only part of the separator may be formed by such an arrangement. Thus the cavity forming portion of the separator may be the entire separator or only part of the separator. A remaining portion of the separator may then preferably be formed by a further separating element, for example a single spacer. While the separator will be the more efficient the larger the portion of a boundary between two conduits is formed by a cavity forming portion of the separator, the advantages of the separator come in useful if only part of the separator is a cavity forming portion. Preferably, the cavity forming portion forms between 40 and 100 percent of a boundary between two neighboring conduits, more preferably at least half of the boundary, for example between 70 and 100 percent.

The heat exchanger according to the invention may be manufactured using only few and preferably structurally simple components. The easy set-up allows using an entire surface of a heat exchanging element for heat conductivity from the cool to the hot side of the heat exchanger.

The terms 'hot fluid' and 'cool fluid' are herein used to describe a fluid, which fluid may be a gas, a liquid or a mixture thereof, that allows for a heat transfer from the hot fluid to the cool fluid in the heat exchanger. The temperature of the cool fluid is lower than that of the hot fluid. While there are basically no limitations as to a temperature difference between or a temperature range of the hot fluid and the cool fluid, in some preferred embodiments, the temperature of the 'hot fluid' at the hot fluid inlet is in a range between 500 and 1000 degrees Celsius, for example around 800 degrees Celsius. In some preferred embodiments the temperature of the cool fluids is between ambient temperature and a few tenths of degrees Celsius at the cool fluid inlets and is about a few hundred degrees Celsius, for example 700 degrees Celsius, at the cool fluid outlets. In some preferred embodiments where two gases are used, one gas may have an outlet temperature of a few hundred degrees Celsius, e.g. 100-300 degrees Celsius, while the other gas may be at an outlet temperature of several hundred degrees Celsius, e.g. 500-800 degrees Celsius. Thus, a temperature difference of the two gases may be in a range of up to several hundred degrees Celsius, e.g. 300 to 500 degrees Celsius. In some preferred embodiments where two liquids are used, these may for example have a temperature difference of only several tenths degrees Celsius, e.g. 30 to 60 degree Celsius. Preferably, the temperature of the two liquids are also only at a few tenths degrees Celsius, e.g. 15-40 degrees Celsius for one liquid and 50-90 degrees Celsius for the second liquid.

The term 'neighbouring conduits' or 'conduits arranged next to each other' is in the following used for two or more conduits arranged next to each other on a same side of the heat exchanging element with the conduits being separated by the separator. Thereby, the neighbouring conduits lie in a same plane preferably in direct contact with the heat exchanging element.

According to an aspect of the heat exchanger according to the invention, the separator separates the further conduit from the respective cool or hot conduit in a fluid-tight manner, wherein at least one separating element is connected with the heat exchanging element in a fluid-tight manner. Such a fluid-tight connection is especially favourable or may even be required if different fluids are guided through neighbouring conduits, for example if the fluids differ in temperature, aggregate state or chemical composition.

For achieving a fluid-tight connection between two conduits, i.e. between the further conduit and either the cool or the hot conduit, it may suffice to connect one separating element only of the separator on an upper and lower length side of the separating element with the heat exchanging element in a fluid-tight manner, for example by welding or brazing. If the second separating element of the separator is not connected to the heat exchanging element in a fluid-tight manner, these leaks may serve a fluid flowing in the neighbouring conduit to enter and leave the cavity formed between the two separating elements of the separator through these leaks. Such a fluid connection between cavity and one neighbouring conduit serves as pressure compensation but does not allow for a high fluid exchange between cavity and neighbouring conduit or inside and along the cavity. Thereby, it is guaranteed that heat conduction through the cavity is kept at a minimum.

For pressure compensation between cavity and one of the conduits, in some preferred embodiments of the heat exchanger according to the invention, at least one opening is provided in the separator. By this a fluid connection is provided between the cavity and the respective cool or hot conduit, which is separated from the further conduit by the separator.

The at least one opening is preferably arranged in a separating element of the separator. The at least one opening is designed to allow for pressure compensation. It allows only little fluid flow to enter the cavity or little or no fluid flow through the cavity in order to restrict or suppress heat conduction through the separator. An opening may also be an open cavity at one end of the cavity.

According to a further aspect of the heat exchanger according to the invention, the separator comprises obstructions adapted to constrain a flow of fluid into or in the cavity. To constrain a flow of fluid in the cavity, obstructions may for example be arranged in wall portions of the separator, preferably in those wall portions of the heat exchanging element forming part of the cavity. Obstruction may also be arranged in or near openings in the separator to hinder a flow of fluid to enter or leave the cavity undisturbed. Preferably, obstructions are indentations, dimples, grooves, protrusions or corrugations of random or regular order. Preferably, obstructions are integrated into a wall of the heat exchanger, for example into a heat exchanging plate. However, obstructions may also be separate parts arranged in the separator, preferably in the cavity, for example corrugated strips of a sheet material such as for example a metal sheet.

Leaks, openings, obstructions or the like in a cavity or in a separator allow for pressure compensation between cavity and neighbouring conduit or an outlet of the heat exchanger and for limiting or suppressing a flow in the cavity. The two separating elements of a separator as well as these elements are preferably arranged and dimensioned such that no fluid flow exists through the cavity or that a fluid flow through the cavity or parts of the cavity is substantially less than a fluid flow in the neighbouring conduits. Preferably, the velocity of a fluid flow in a cavity is at a maximum of 5 percent, more preferably less that 1 to 2 percent, of the velocity of the fluid flow in the neighboring conduit, especially of the neighbouring conduit the cavity is in restricted fluid communication with.

According to another aspect of the heat exchanger according to the invention, a further separator is arranged on an opposite side of the heat exchanging element. Preferably, this further separator separates an identical fluid flow in the cool or hot conduit, respectively, that is arranged on the opposite side of the heat exchanging element. Preferably, such a further separator is arranged in a same position in the heat exchanger than the separator (same orientation and position but on the opposite side of the heat exchanging element). That is, preferably, separator and further separator are arranged above each other, separated by the heat exchanging element only. The further separator may be identical with the separator. However, since an identical fluid is guided in the neighbouring conduits of the further separator, a certain limited flow exchange between the two identical flows in the neighbouring conduits may be allowed or even desired. Thus, the further separator may separate the neighbouring conduits not in a fluid-tight manner but preferably with a preset fluid exchange rate between neighbouring conduits. The provision of a further separator comprising two separating elements arranged at a distance to each other and forming a cavity in between arranged at opposite sides of a heat exchanging element provides a mechanical support for the heat exchanger. This is especially favorable in heat exchangers with large temperature differences and deformation of elements accordingly. However, the arrangement of a further separator, especially at the same location than the separator just on opposite sides of the heat exchanging element provides more control of the heat regime in the heat exchanger. Two opposing cavities may have more moderate temperature differences than one cavity for example on a cool side opposed to an entirely hot side.

According to another aspect of the heat exchanger according to the invention, the heat exchanging element comprises an extendable structure, for example corrugations, adapted to allow for deformation of the heat exchanging element upon thermal expansion. Upon heating, expansion of the material is then taken up by the extendable structure thus the structure is expanding without the material of the heat exchanging element being subject to mechanical stress or rupture. Upon cooling down thermal contraction is again absorbed by the extendable structure of the heat exchanging element. An extendable structure of the heat exchanging element preferably allows for longitudinal and/or transversal expansion and contraction in a plane of the heat exchanging element, for example of a heat conductive plate. In preferred embodiments the extendable structure forms a side wall of the cavity, and preferably the extendable structure is directly formed by the portion of the heat exchanging element at the location of the cavity. An extendable structure may also serve as obstruction to influence a fluid flow in the cavity.

In a further aspect of the heat exchanger according to the invention, the separator further comprises a further separating element. For separating the further conduit from the respective neighbouring cool or hot conduit, the separator may comprise a further separating element, such as for example a single spacer. A further separating element is preferably arranged to separate inlets or outlets of neighbouring conduits. In a constructional simple arrangement the cavity forming portion of the separator extends from one end of the heat exchanging element along a portion, for example, at least half of the length, of the heat exchanging element. The further separating element extends essentially normal to this cavity forming portion of the separator to one lateral side of the heat exchanging element thus completely separating one from the other conduit by the separator, however only part of the separation being subject to the effect of the cavity forming portion of the separator.

In embodiments of the heat exchanger according to the invention where a separator extends along an entire length of the heat conductive element, preferably the two separating elements forming a cavity in between them also extend along the entire length of the heat conductive element.

A separator may also serve as flow deviator in a conduit. Thus, constructional variations for two neighbouring conduits, but especially for a conduit itself may be multiplied. By this, many more combinations of arrangements of hot and cold sides of the heat exchanger according to the invention, including fluid selection and optimization in view of for example heat transfer may be realized, as well as applications of the heat exchanger according to the invention.

By way of example, co-flow and counter-flow arrangements with one single direction of hot flow may be realized with respect to one cool conduit only.

Therefore, according to another aspect of the heat exchanger according to the invention, the further conduit comprises a first conduit portion and a second conduit portion arranged in parallel and separated from each other by the separator. Thereby the fluid is enabled to flow in one direction in the first conduit portion and to flow in the second conduit portion in a direction opposite to the one direction of the first conduit portion. A port conduit portion is arranged between said first and second conduit portions of the further conduit.

In the further conduit the fluid flows in a counter-flow direction in the first and second conduit portion. When a parallel flow direction of the hot flow (parallel to the further fluid flow direction in the cool conduit) is assumed on the reverse side of the heat exchanging element, then the further conduit comprises a co-flow and a counter-flow arrangement in the first and the second conduit portion with respect to the heat exchanging application. In combination with the hot fluid this may be regarded as two individual heat exchangers (one by the first conduit portion and a second one by the second conduit portion) but combined in the heat exchanger according to the invention and connected by the port conduit portion. Thus, in a basic arrangement, not only two heat exchangers are combined in the heat exchanger according to the invention but three heat exchangers, whereby two of them are connected by an internal port. Such an arrangement allows for a multitude of applications and variations, requiring very low space and low manufacturing and material cost.

It goes without saying that the same scenario may be applied if the further conduit is a cool conduit or a hot conduit or if the separator is a further separator between identical neighbouring flows.

According to another aspect of the heat exchanger according to the invention, the heat exchanging element comprises profile structures. The profile structures of a lower length side of the cool, the hot or the further conduit is different in at least one of shape, size and arrangement of the profile structure of an upper length side of the cool, the hot or the further conduit.

Profile structures may be used to cause turbulences in a fluid flow to influence flow dynamics and preferably support heat exchange between hot and cold side of the heat exchanger. Profile structures preferably enhance the size of a surface of a heat exchanging element. Profile structures may be surface structures of a wall or parts of a wall of the respective conduits. Profile structures may also be profiled walls. Examples of profile structures are dips, indentations, fins or grooves on a surface or stamped wave-like or "chevron" pattern.

In some preferred embodiments of the heat exchanger according to the invention, the heat exchanging element is a heat conductive plate and in some preferred embodiments the heat exchanger according to the invention is constructed as a multi-stack heat exchanger. Plate heat exchangers are very effective due to their large surface areas useable for heat transfer. The manufacture of plate arrangements is convenient and may easily be extended to multiple-stacks. Especially in multiple-stacks, separators may be provided between each plate of the stack for mechanical stability of the stack.

According to an aspect of the heat exchanger according to the invention, a plurality of heat exchanging elements, preferably heat conductive plates, and a plurality of separators are arranged in an alternating manner forming a respective plurality of cool conduits and hot conduits between the heat conductive plates and forming a respective plurality of further conduits next to the separators. In multi-stack heat exchangers, preferably cool fluid inlets are merged into a cool fluid inlet collector, cool fluid outlets are merged into a cool fluid outlet collector, hot fluid inlets are merged into a hot fluid inlet collector, hot fluid outlets are merged into a hot fluid outlet collector, further fluid inlets are merged into a further inlet collector and further fluid outlets are merged into a further outlet collector. Preferably, all inlets are merged into one respective inlet collector and all outlets are merged into one respective outlet collector. The arrangement thereby forms a multiple-stack of multi-flow heat exchangers. By the provision of collectors, one supply and one discharge only may be required for the plurality of conduits. In one variant, every layer of the heat exchanger comprises a separator (or further separator) separating two different flows from each other or separating an identical flow into two or more flows. In another variant, a separator is arranged between every other heat conductive plate such that only different flows, such as a cool/hot conduit from the further conduit, are separated by the separator.

A plate arrangement of the heat exchanger according to the invention allows for an easy extension of the heat exchanger to form a multiple-stack of parallelly arranged heat exchangers. Thereby, heat exchanging plates are stacked next to each other, distanced from each other by the separators and by spacers.

While the heat exchanger according to the invention may be manufactured in a cost efficient manner, this cost efficiency is even more perceivable if a multiple-stack of heat exchangers according to the invention is manufactured. Identical or preferably two types of heat conductive plates that are adapted to the conduit arrangements on the two sides (front and reverse side) of the heat conductive plates may be stacked in alternating order. Also same and only few types of further separating elements may be used. Only one envelope is required for a heat exchanger according to the invention or a multiple-stack combining a plurality of heat exchangers. No assembly costs are required for connecting separate heat exchangers, as the apparatus is manufactured as a single component.

According to a further aspect of the heat exchanger according to the invention, in a multi-stack heat exchanger, two different kinds of heat conductive plates are arranged in alternating manner and most or preferably all separating elements arranged between adjacent heat conductive plates are I-shaped or L-shaped. Such an arrangement is very cost efficient in manufacture and production. A heat conductive plate may be provided with extendable structures and/or profile structures in one process step, for example by stamping or cutting. The manufacture of I-shaped and L-shaped separating elements may be performed in a material saving manner without no or only little waste, for example by cutting corresponding separating elements from a sheet of material, for example a metal sheet or ceramic plate, which separating elements are then attached to the heat conductive plate. However, separating elements may also be provided in the heat conductive plate before a stamping or cutting of the heat conductive plate takes place. This may for example be realized in the form of tailored blanks, where separating elements are preferably attached to a sheet of heat conductive material in a continuous manner, for example by laser welding.

Adjacent heat conductive plates are preferably different with respect to the arrangement and form of structures, either extendable structures, profile structures or both. This is due to the fact that a lower side and an upper side of a conduit (typically the wall portions of adjacent heat conductive plates) is preferably provided with different structures. Preferably, such structures are arranged such that structures facing each other are not able to fall into itself when the two adjacent heat conductive plates are pressed together. For example, when an underpressure is generated in the conduit by a fluid flow, thin heat conductive plates or heat exchanging elements may be pressed against each other and may close a conduit, partially or completely. A closing of a conduit by profile structures may for example be prevented by arranging the profile structures such that protrusions and grooves do not exactly face each other. For example corrugations may be arranged at a tilted angle, wherein a tilt angle of a corrugation pattern of one plate arranged in a mounted state above a conduit may be positive and a tilt angle of a corrugation pattern of the adjacent plate arranged in a mounted state below a conduit may be negative, for example plus/minus 20 to 45 degrees.

With rectangular shaped heat conductive plates, conduits are preferably also arranged comprising no or 90 degrees angles only. Thereby, all edges of the conductive plate may be closed by I-shaped or L-shaped separating elements, and a separator arranged in a more central region of the conductive plate may also be formed by I-shaped or possible also L-shaped separating elements only. Individual separating elements may be welded or brazed in regions of contact in order to provide a connection, preferably a fluid-tight connection.

According to another aspect of the invention, there is provided a method for exchanging heat between a cool fluid and a hot fluid and at least one further fluid. The method comprises the step of arranging a heat exchanging element between a cool fluid flow and a hot fluid flow. It further comprises the step of guiding a further fluid flow next to the cool fluid flow or next to the hot fluid flow, wherein the further fluid flow is guided along a same side of the heat exchanging element as said respective cool fluid flow or hot fluid flow. The method yet further comprises the steps of separating the further fluid flow from the respective cool fluid flow or hot fluid flow, preferably in a fluid-tight manner, by arranging a cavity between the further fluid flow and the respective cool or hot fluid flow, and limiting heat conduction through the separator by limiting movement of a fluid into or in the cavity.

The advantages of the aspects of the method have already been discussed with the aspects of the heat exchanger and will not be repeated.

According to another aspect of the method according to the invention, the at least one further fluid is different from the cool fluid or the hot fluid by at least one of temperature or aggregate state. Preferably, liquid and gaseous fluids are used simultaneously in different conduits in the heat exchanger or method according to the invention. Preferably, the liquids or gases used in neighbouring conduits, i.e. either hot conduits or cool conduits have a different temperature. The heat exchanger and method according to the invention is especially suitable for high temperature differences of neighbouring fluid flows, such as temperature differences of up to several hundred degrees Celsius, for example up to 500 degrees Celsius.

In the method according to the invention, the further fluid or respective cool or hot fluid is allowed to enter the cavity but movement of the fluid flow in the cavity is limited and preferably also an entering of the fluid flow into and through the cavity is limited, depending on the arrangement of the separator and the cavity.

According to another aspect of the method according to the invention, the method comprises the step of arranging a further separator on an opposite side of the heat exchanging element.

The apparatus and method according to the invention is favourably used in combination with one or a plurality of fuel cells, preferably fuel cells such as solid oxide fuel cells (SOFC). SOFC fuel cells generally need two preheated incoming gas fluids and provide two hot gas outlets, which can be cooled for heat regeneration. However, large temperature differences exist between these hot flows and the to-be-warmed cool flows. By way of example only, the hot cathode gas leaves the SOFC at about 950 degrees Celsius and may be cooled by a gas-gas heat exchanger down to 150 to 250 degrees Celsius. The gas is further cooled by a gas/water heat exchanger to recuperate the residual heat. Therein, water is heated only by about 5 to 10 degrees, from about 20 to 25-30 degrees Celsius. This may be combined in the heat exchanger according to the invention using two gas flows, air and hot gas outlet from the SOFC and one liquid flow (cold water). The high mechanical stress induced by the large temperature difference between cold water and hot gas may be handled by the specific construction of the separator as described in this application. In this example of the heat exchanger combined with a SOFC, water and air may be guided on a same side in respective first and second 'cool' conduits. The hot gas may then be guided on the reverse side of the heat conductive plate in one hot conduit along the entire length of the heat exchanger. While the water may be guided in a cross flow arrangement on the already cooled down region of the hot gas, the air may be introduced into and discharged from the heat exchanger on the two lateral sides, but is preferably guided in an essentially counter-flow direction with respect to the hot gas. Thus the air may be heated from a few tenth degrees Celsius, e.g. 50 degrees Celsius, up to several hundredths degrees Celsius, e.g. 700-750 degrees Celsius, while the hot gas is cooled from about 900 degrees Celsius down to about 50-80 degrees Celsius.

BRIEF DESCRIPTION OF FIGURES

In the following embodiments of the apparatus according to the invention are shown by means of the enclosed drawings, wherein.

DETAILED DESCRIPTION

It is to be understood that this invention is not limited to the specific devices, methods, conditions, or parameters of the example embodiments described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "the" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

Figure 1:
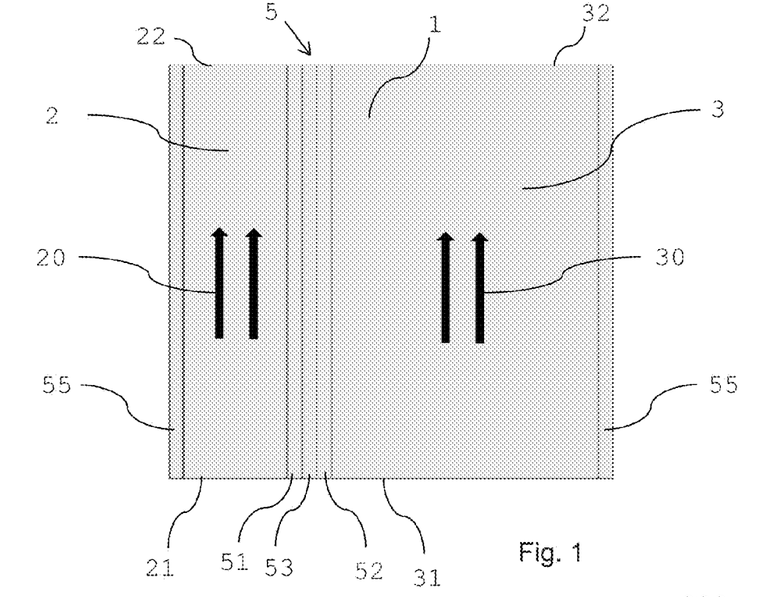
FIG. 1 shows a view of a heat exchanger with two fluid flows guided in parallel in the same plane.

In FIG. 1 a view into a plate heat exchanger with a first conduit 2 and a second conduit 3 for a first and second fluid 20,30 flowing in parallel and next to each other is shown. A heat conductive plate 1, for example made of a heat conductive material such as a thin metal plate, comprises a separator 5 arranged thereon. Separator 5 as well as two spacers 55 are arranged along the entire length of the heat conductive plate 1. The separator separates the first and the second conduit 2,3 from each other, preferably in a fluid-tight manner. According to the location of separator 5 with respect to the lateral sides of the heat conductive plate 1, the widths of the conduits 2,3 may be defined. The two spacers 55 are arranged along the two lateral sides of the heat conductive plate 1, along the edges, to close the first and the second conduits 2,3 along these lateral sides, preferably in a fluid-tight manner. Separator 5 comprises two separating elements 51,52, for example spacers, arranged at a distance to each other. A cavity 53 is formed between the two separating elements 51,52. Cavity 53 may be open at one or both ends, with respect to an upstream or downstream end of the two conduits 2,3 as shown in FIG. 1. Thus, a fluid is allowed to enter and leave cavity 53 in order to allow for a pressure compensation of the fluid in the cavity, however, fluid flow through the cavity is—at least due to its limited dimensions—limited, thus providing low heat exchange between the first and second conduits 2,3. Cavity 53 may also be closed at one or both of its upstream or downstream ends. Then, preferably, one of the separating element 51,52 is provided with at least one opening, for example provided as groove or grooves along a width of the separating element or provided in open paths due to a non-fluid-tight connection of said separating element with heat conductive plate 1. Such an opening allows for a small fluid exchange between cavity 53 through the groove in the respective separating element with the adjacent first or second neighboring conduit 2,3. Open cavity ends or openings between cavity and conduit are designed to allow for a pressure adjustment but preferably no or only low fluid flow through the cavity 53. Also a design of the interior of the cavity 53 may be adapted to reduce a fluid flow in the cavity. This may for example be done by providing indentations, dimples or mechanical obstructions to hinder a flow from flowing. One, two or further fluid flows on the reverse side of the heat conductive plate 1 (back side of drawing plane) may be arranged in a co-flow, a counter-flow or a cross-flow arrangement to each other or with respect to the two flows 20,30 shown in FIG. 1 on the front side of the heat conductive plate 1. Two or further flows on the reverse side of the heat conductive plate 1 may also be separated by separating elements. Preferably, such separating elements are arranged at a same position relative to the heat conductive plate 1. While first, second and possibly further neighbouring conduits are preferably used for different fluid flows, one or two or further conduits on the back side of the heat conductive plate are preferably used for the same fluid flow.

Figure 2:
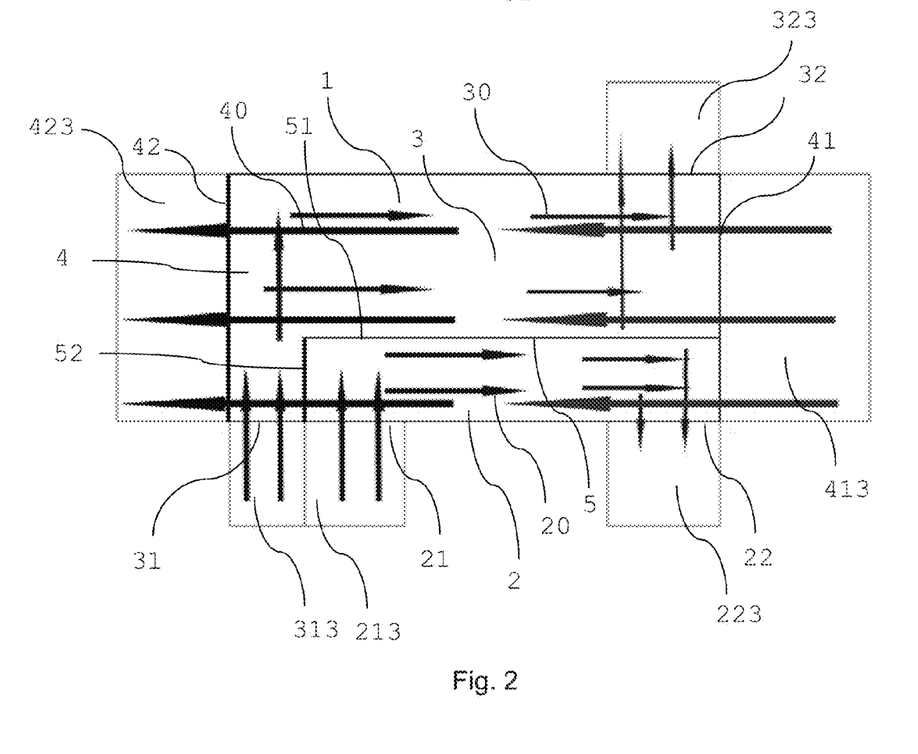
FIG. 2 is a sketch of a heat exchanger in a counter-flow arrangement including collectors with one hot flow and two cool flows.

FIG. 2 is a schematic through view of a heat exchanger with a rectangular heat conductive plate 1. On a front (or upper) side of the heat conductive plate 1 (with respect to the drawing plane) a first cool conduit 2 and a second cool conduit 3 is arranged next to each other separated by separator 5 (for simplicity reasons drawn as single line only). A first cool fluid 20 enters the first cool conduit 2 at first cool fluid inlet 21 arranged at one lateral side of the heat exchanging plate 1. A second cool fluid 30 enters the second cool conduit 3 at second cool fluid inlet 31 arranged at the same lateral side of the heat conductive plate 1. The second cool fluid inlet 31 is arranged more to the one downstream end of the heat exchanging plate 1, downstream with respect to the hot fluid flow described below. Both cool flows flow parallel in a neighbouring co-flow arrangement though their respective conduits 2,3 along the length of the heat conductive plate 1. In case of the second cool fluid 30, the fluid flows along the entire length of the heat conductive plate and leaves the second cool conduit 3 at the second cool fluid outlet 32 at the opposite lateral side of the heat conductive plate 1. In case of the first cool fluid 20, said cool fluid 20 flows along a part of the length of the heat conductive plate 1 only and leaves the first cool conduit 2 at first cool conduit outlet 22 arranged at the same lateral side of the heat conductive plate 1 as the first cool conduit inlet 21. The areas (width times length) of the two cool conduits 2,3 sum up to the entire area of the heat conductive plate, disregarding the areas of the separator 5 and spacers. On the reverse or opposite side of the heat conductive plate 1 a hot fluid 40 in a hot conduit 4 flows in a counter direction with respect to the cool fluid flows 20,30. The hot conduit 4 extends over the entire length and width of the heat exchanging plate 1 and enters and leaves the hot conduit at respective hot conduit inlet 41 and hot conduit outlet 42 arranged at a downstream and upstream end of the heat exchanger.

First cool conduit 2 is not only shorter than second cool conduit 2 but also smaller in width. By variation of length and width, the dwell time of a fluid in a conduit, the time that fluid is subject to a heat exchange with the hot fluid and also the location of a specific temperature regime the fluid shall be exposed to may be chosen and varied. A mass flow, a heat exchange, back pressure etc. may be adapted to the required use of the heat exchanger taking into account the kind of fluids used in the conduits of the multi-flow heat exchanger, for example gases or liquids or both.

All inlets 21,31,41 and outlets 22,32,42 are provided with respective inlet collectors 213,313,413 and outlet collectors 223,323,423. In collectors, respective inlets and outlets of a stack of heat exchangers are 'collected' in one single collector per inlet or outlet, respectively. Thereby, a stack of heat exchangers must only be provided with one supply and one discharge per conduit for a fluid to be supplied to and discharged from the heat exchanger.

Separator 5 in FIG. 2 comprises a longitudinal section 51 extending along the length of the heat exchanging plate 1 and a transversal section 52 extending transversal to the heat exchanging plate 1. Preferably, only the longitudinal section 51 of the separator 5 is provided with a cavity. However, the cavity may extend also or only along the transversal section 52 of the separator 5, for example designed as a separate cavity.

While one hot conduit 4 only may be provided, the hot conduit may for example also be divided by a separator. This separator may for example be arranged along the longitudinal section 51 only, however on the opposite side of the heat conductive plate 1.

Figure 3:
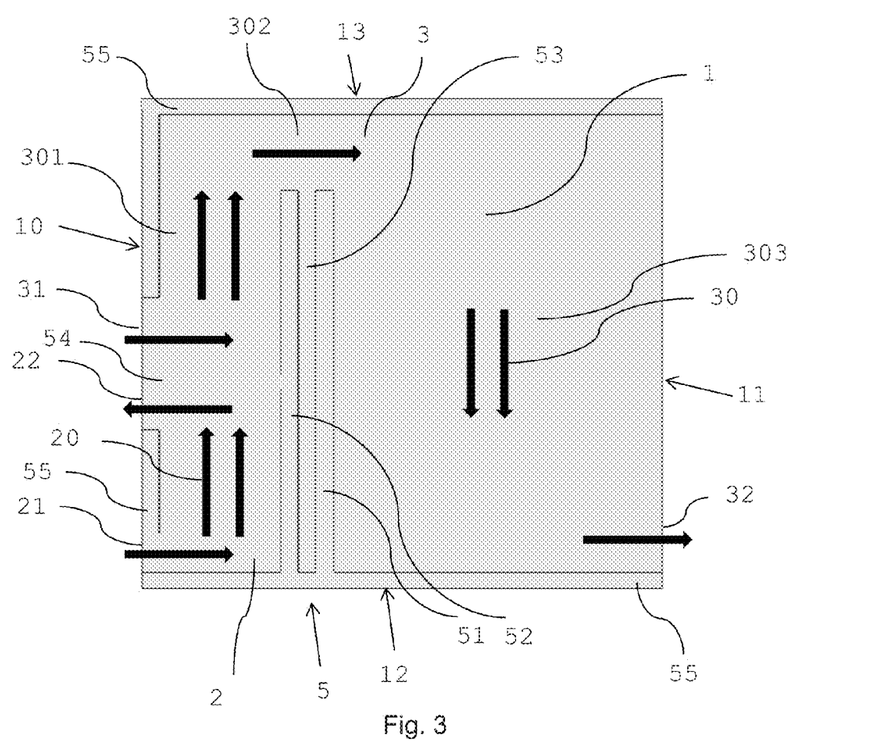
FIG. 3 is a view of a heat exchanger including flow deviation.

In FIG. 3 separator 5 is not only separating and preferably also isolating and compensating for mechanical stresses, separator 5 acts as flow deviator of second flow 30. Separator 5 is arranged parallel to two opposite lateral sides 10,11 of the heat conductive plate 1. Separator 5 extends from a lower side 12 (with respect to the drawing) of the heat conductive plate 1 up to the upper side 13 but not along the entire length of the plate 1. Separator 5 is arranged closer to lateral side 10, thereby incompletely separating the plane of the heat conductive plate 1 in a smaller and a larger portion. The cavity 53 between separating elements 51,52 of separator 5 is open at its upper end versus the second conduit 3 such that the second fluid 30 may enter and leave cavity 53 through said open end of the cavity.

Both fluid inlets 21,31 are arranged at lateral side 10. First fluid 20 enters first conduit 2, passes in an upward direction between spacer 55 (arranged along entire lower edge 12 of plate 1) and separator 5 and leaves first conduit 2 at first outlet 22 arranged at the same lateral side 10 but some distance apart from first inlet 21. The distance between first inlet 21 and outlet 22 corresponds to the length of lateral spacer 55 closing first conduit 2 to lateral side 10. Second fluid 30 enters second conduit 3 at lateral side 10 and is then forced by separator 5 to flow in an upward direction (versus upper edge 13 of plate 1). At port conduit portion 302 between upper end of separator 5 and upper edge 13 of heat conductive plate 1 second flow 30 is forced around separator 5 and into a downward direction to second outlet 32, arranged at the opposite lateral side 11 next to lower edge 12 of heat conductive plate 1. In this embodiment, second flow 30 itself comprises a counter-flow direction in upward conduit portion 301 and downward conduit portion 303. These two flow portions 301,303 may—in combination with a hot fluid (or cool fluid, respectively) on the reverse side of the heat conductive plate 1—be regarded as two individual heat exchangers but combined in the heat exchanger according to the invention and connected by port conduit portion 302. Port conduit portion 302 functions as port between upward conduit portion 301 and downward conduit portion 303 or between the respective upward and downward second flow portions. A simple configuration, i.e. with one fluid conduit only arranged on the reverse side of the heat conductive plate 1, three heat exchangers may be combined in one heat exchanger according to the invention. It goes without saying that such an arrangement allows for a multitude of applications and variations, requiring very low space and low cost.

First inlet 21 and second inlet 31 are separated by a single spacer 54, extending normally to the two separating elements 51,52. Shall a thermal isolation be increased between first and second flow 20, 30 in the region of the inlets 21,31 the single spacer 54 may also be designed as separator 5 comprising a cavity.

Figure 4:
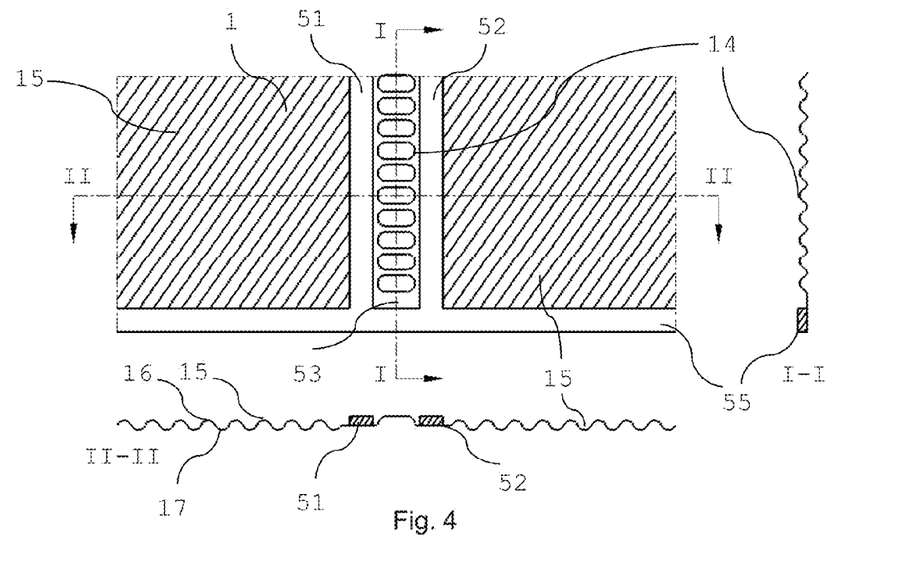
FIG. 4 is a schematic drawing of a portion of a heat conductive plate for the heat exchanger according to the invention, including cross sectional views along line I-I (along the cavity) and line II-II (across the heat conductive plate normal to the cavity).

In FIG. 4 a portion of the heat conductive plate 1 is shown, as well as cross sections through the plate along the cavity (I-I) and normal to the cavity (II-II). The plate 1 is provided with several structures 14,15, preferably by stamping. Preferably, all structures are brought into the plate in one process step. A portion of the heat conductive plate 1 forming a side of a cavity is formed in a harmonica-type manner for example by individual indentations or protrusions arranged in a regular manner along the cavity, such structured cavity working as a bellow 14. This bellow section 14 allows for an expansion and retraction of this section of the plate 1 upon thermal heating and cooling of plate 1 without breaking the material of the heat conductive plate 1. The portions of the heat conductive plate 1 forming side walls of a fluid conduit are provided with profiles 15, for example indentations, grooves or other structures suitable as profiles. The regular arrangement of corrugations 15 in FIG. 4 is tilted from a vertical or horizontal axis (length or width), preferably by 30 degrees. Since a fluid flow preferably flows—mainly or completely—parallel to the length or width of the plate 1, the corrugations 15 thus serve to alter the fluid flows in the conduits. Profiles in conduit portions preferably are not identical for neighbouring conduits or for cool or hot conduits and are preferably not identical on a front 16 (upper) and reverse 17 (lower) side of the heat conductive plate 1. Thus a flow in a conduit does not see the same structure on an upper and lower side of the flow, which may influence the flow characteristic. In FIG. 4, the corrugations are arranged in a regular manner. They may—as well as other structures—also be arranged irregularly or form irregular arrangements.

The invention has been described with reference to the embodiments shown in the drawings. However, it is obvious to a person skilled in the art that many variations, modifications or changes are possible without departing from the scope of the invention. By way of example only, the arrangement of the paths of the cool fluids and the hot fluids may be optimized for a heat exchanging process, may be adapted to a desired heat exchanging rate, may be adapted to a mass flow or pressure drop in individual conduits, may be adapted to the fluids used or conduit arrangement of cool flows may be applied to hot conduits. Also the arrangements and specific features of the separators are not limited to the examples shown in the drawings and for the use for separating different fluid flows but may for example also be used for separating identical fluid flows.

The invention claimed is:

1. A heat exchanger comprising:
a cool heat exchanging conduit adapted for guiding a cool fluid, the cool heat exchanging conduit having a cool fluid inlet and a cool fluid outlet;
a hot heat exchanging conduit adapted for guiding a hot fluid, the hot heat exchanging conduit having a hot fluid inlet and a hot fluid outlet;
a heat exchanging element arranged between the cool heat exchanging conduit and the hot heat exchanging conduit for heat exchange between the cool fluid and the hot fluid;
at least one additional heat exchanging conduit for guiding an additional fluid, the at least one additional heat exchanging conduit having a fluid inlet and a fluid outlet, wherein the at least one additional heat exchanging conduit is arranged adjacent at least one heat exchanging conduit from the group consisting of the cool heat exchanging conduit and the hot heat exchanging conduit, and on a same side of the heat exchanging element as said at least one heat exchanging conduit from the group consisting of the cool heat exchanging conduit and the hot heat exchanging conduit, and wherein the at least one additional heat exchanging conduit is separated from the at least one heat exchanging conduit from the group consisting of the cool heat exchanging conduit and the hot heat exchanging conduit by a separator comprising two separating elements arranged at a distance to each other and forming a cavity between the two separating elements, the separator limiting a fluid flow into or within the cavity the at least one additional heat exchanging conduit and the at least one heat exchanging conduit from the group consisting of the cool heat exchanging conduit and the hot heat exchanging conduit, and arranged on the same side of the heat exchanging element.

2. The heat exchanger of claim 1, wherein the separator separates the at least one additional heat exchanging conduit from the at least one heat exchanging conduit from the group consisting of the cool heat exchanging conduit and the hot heat exchanging conduit in a fluid-tight manner, wherein at least one separating element of the two separating elements is connected with the heat exchanging element in a fluid-tight manner.

3. The heat exchanger of claim 1, wherein at least one opening is provided in the separator to provide a fluid connection between the cavity and the at least one heat exchanging conduit from the group consisting of the cool heat exchanging conduit and the hot heat exchanging conduit, and separated from the at least one additional heat exchanging conduit by the separator.

4. The heat exchanger of claim 1, wherein the separator comprises obstructions adapted to constrain a flow of fluid into or within the cavity.

5. The heat exchanger of claim 1, wherein the heat exchanging element is a heat conductive plate.

\* \* \* \* \*